US007158960B2

(12) United States Patent
Ferguson et al.

(10) Patent No.: US 7,158,960 B2
(45) Date of Patent: Jan. 2, 2007

(54) ASYNCHRONOUS NETWORK COLLABORATION METHOD AND APPARATUS

(75) Inventors: Bradley Ferguson, Palo Alto, CA (US); Gregory D. Clemenson, Palo Alto, CA (US); Jose Miguel Pinillia, San Carlos, CA (US)

(73) Assignee: Informative, Inc., Brisband, CA (US)

( * ) Notice: Subject to any disclaimer, the term of this patent is extended or adjusted under 35 U.S.C. 154(b) by 422 days.

(21) Appl. No.: 09/952,753

(22) Filed: Sep. 13, 2001

(65) Prior Publication Data

US 2002/0095392 A1    Jul. 18, 2002

Related U.S. Application Data

(63) Continuation of application No. 09/416,143, filed on Oct. 12, 1999, now Pat. No. 6,304,861, which is a continuation of application No. 08/657,984, filed on Jun. 4, 1996, now Pat. No. 5,995,951.

(60) Provisional application No. 60/317,895, filed on Sep. 7, 2001.

(51) Int. Cl.
*G06F 17/00*    (2006.01)

(52) U.S. Cl. ..................................... 706/50
(58) Field of Classification Search .................. 706/50
See application file for complete search history.

(56) References Cited

U.S. PATENT DOCUMENTS

| 5,862,325 | A  | * | 1/1999  | Reed et al. ................. 709/201 |
| 5,995,951 | A  | * | 11/1999 | Ferguson ..................... 706/10 |
| 6,292,830 | B1 | * | 9/2001  | Taylor et al. ............... 709/224 |
| 6,304,861 | B1 | * | 10/2001 | Ferguson ..................... 706/10 |
| 6,614,781 | B1 | * | 9/2003  | Elliott et al. ................ 370/352 |
| 6,652,283 | B1 | * | 11/2003 | Van Schaack et al. ...... 434/236 |
| 6,778,970 | B1 | * | 8/2004  | Au ............................... 706/55 |

OTHER PUBLICATIONS

Symbolic debugging of globally optimized behavioral specifications Inki Hong; Kirovski, D.; Potkonjak, M.; Papaefthymiou, M.C.;□□Design Automation Conference, 2000. IEEE, Digital Object Identifier 10.1109/ASPDAC.2000.835132 Page(s):397-400.*
Symbolic debugging embedded hardware and software Koushanfar, F.; Kirovski, D.; Inki Hong; Potkonjak, M.; Papaefthymiou, M.C.; Computer-Aided Design of Integrated Circuits and Systems, IEEE Digital Object Identifier 10.1109/43.913757 Page(s):392-401.*

\* cited by examiner

*Primary Examiner*—Wilbert L. Starks, Jr.
*Assistant Examiner*—Michael B. Holmes
(74) *Attorney, Agent, or Firm*—Townsend and Townsend and Crew LLP

(57) ABSTRACT

A method for a computer system including a memory includes storing a plurality of statements in the memory, selecting a first subset of statements from the plurality of statements, sending the first subset of statements to a first user at a computer client, receiving a first selection of statements, the first selection of statement selected from the first subset of statements by the first user, selecting a second subset of statements from the plurality of statements in response to the first selection of statements by the first user, sending the second subset of statements to a second user at a computer client, receiving a second selection of statements, the second selection of statement selected from the second subset of statements by the second user, determining a proposed selection of statements from the plurality of statements in response to the first selection of statements by the first user and to the second selection of statements by the second user, sending the proposed selection of statements to a third user.

36 Claims, 16 Drawing Sheets

Tell us what you would like to add to the Oldsmobile Aurora ← 700

Below is what other visitors to our web site have said they want to add to the Aurora. Put a check mark next to all items that you would like to add. Then, if there's anything else that you want to add to the Aurora that isn't listed below, put it in the box to add it to the list.

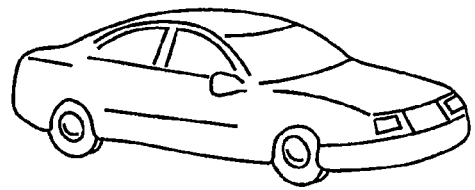

Oldsmobile Aurora

I'd like to add [_____720_____] ( Add )

1. ☐ I would offer a sport coupe version
2. ☐ A light under the hood for to check the oil on the night
3. ☐ I would offer a V6 with a low pressure turbo ←— 850
4. ☐ The famous Night-Vision system
5. ☐ An alarm telling us we go faster than a predetermined speed
6. ☐ retractable convertible roof
7. ☐ I would offer 4WD version  ←— 730
8. ☐ a heat control for the rear

} 710

750
( Back ) ( Next )

*FIG. 16A*

Tell us what you would like to add to the Oldsmobile Aurora

Below is what other visitors to our web site have said they want to add to the Aurora. Put a check mark next to all items that you would like to add. Then, if there's anything else that you want to add to the Aurora that isn't listed below, put it in the box to add it to the list.

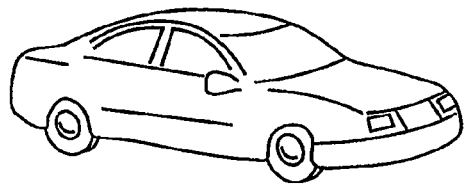

*Oldsmobile Aurora*

I'd like to add [          ] ( Add )

1. ☐ I would offer a sport coupe version
2. ☐ A light under the hood for to check the oil on the night
3. ☑ I would offer a V6 with a low pressure turbo ← — 740
4. ☑ The famous Night-Vision system ←
5. ☐ An alarm telling us we go faster than a predetermined speed
6. ☐ retractable convertible roof
7. ☐ I would offer 4WD version
8. ☑ a heat control for the rear — 740

750 — ( Back ) ( Next )

*FIG. 16B*

This is your list.
Arrange it in the order you like.

You can move an item by highlighting it and then clicking the Up/Down arrows until the item is where you want it to be.

Once you click 'Submit' your vote will be cast and your suggestions will be visible for everyone else to consider.

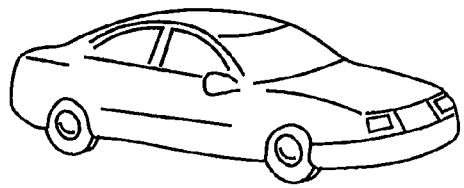

Oldsmobile Aurora

My List:

| | Idea |
|---|---|
| 1 | I would offer a V6 with a low pressure turbo |
| 2 | The famous Night-Vision system |
| 3 | a heat control for the rear |

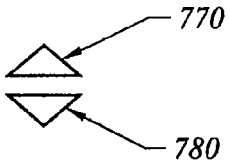

— 770

— 780

Back   Submit

FIG. 16C

This is your list.
Arrange it in the order you like.

You can move an item by highlighting it and then clicking the Up/Down arrows until the item is where you want it to be.

Once you click 'Submit' your vote will be cast and your suggestions will be visible for everyone else to consider.

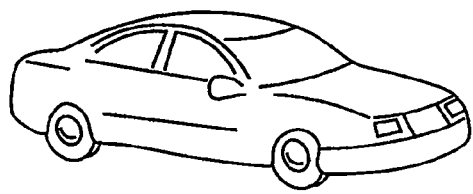

Oldsmobile Aurora

My List:

| | Idea |
|---|---|
| 1 | a heat control for the rear |
| 2 | I would offer a V6 with a low pressure turbo |
| 3 | The famous Night-Vision system |

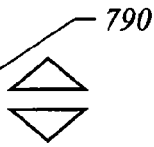

790

Back    Submit

*FIG. 16D*

Here are the five most popular suggestions so far, with your vote taken into acount Don't see your input in this list? Check back in a day or two after others have had the opportunity to see and vote on what you said. Your input may end up in the top five list!

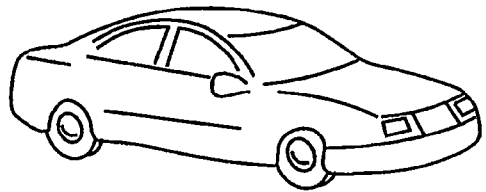

*Oldsmobile Aurora*

| Addition | Popularity |
|---|---|
| I would offer a V6 with a low pressure turbo | ▨▨▨▨▨ |
| A light under the hood for to check the oil on the night | ▨▨▨▨ |
| I would offer 4WD version | ▨▨▨ |
| A larger container for the glass washer liquid | ▨▨ |
| A radio volume control for the back passengers | ▨ |

} 810

( Back )   ( Continue )

*FIG. 16E*

Tell us what you would like to add to the Oldsmobile Aurora ← 700

Below is what other visitors to our web site have said they want to add to the Aurora. Put a check mark next to all items that you would like to add. Then, if there's anything else that you want to add to the Aurora that isn't listed below, put it in the box to add it to the list.

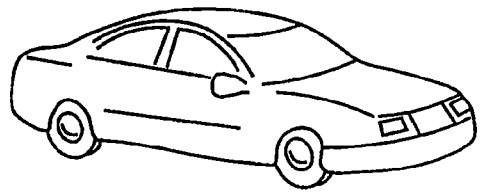

Oldsmobile Aurora

I'd like to add [          ] (Add)  ← 870

1. ☐ INTEGRAL CHILD BOOSTER SEAT  ← 860
2. ☐ I would offer a V6 with a low pressure turbo  ← 850
3. ☐ I would add side air bags  ← 840
4. ☐ A larger container for the glass washer liquid
5. ☐ I would offer 4WD version
6. ☐ A light under the hood for to check the oil on the night   } 830
7. ☐ a heat control for the rear
8. ☐ interior emergency trunk release
9. ☐ The famous Night-Vision system
10. ☐ An alarm telling us we go faster than a predetermined speed (Back) (Next)

*FIG. 16F*

Tell us what you would like to add to the Oldsmobile Aurora

Below is what other visitors to our web site have said they want to add to the Aurora. Put a check mark next to all items that you would like to add. Then, if there's anything else that you want to add to the Aurora that isn't listed below, put it in the box to add it to the list.

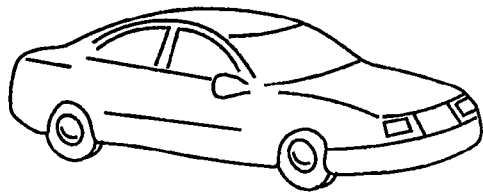

Oldsmobile Aurora

I'd like to add [INTEGRAL CHILD BOOSTER SEAT] (Add) — 860

1. ☐ I would offer a V6 with a low pressure turbo
2. ☐ I would add side air bags
3. ☐ A larger container for the glass washer liquid
4. ☐ I would offer 4WD version
5. ☐ A light under the hood for to check the oil on the night (Back) (Next)

*FIG. 16G*

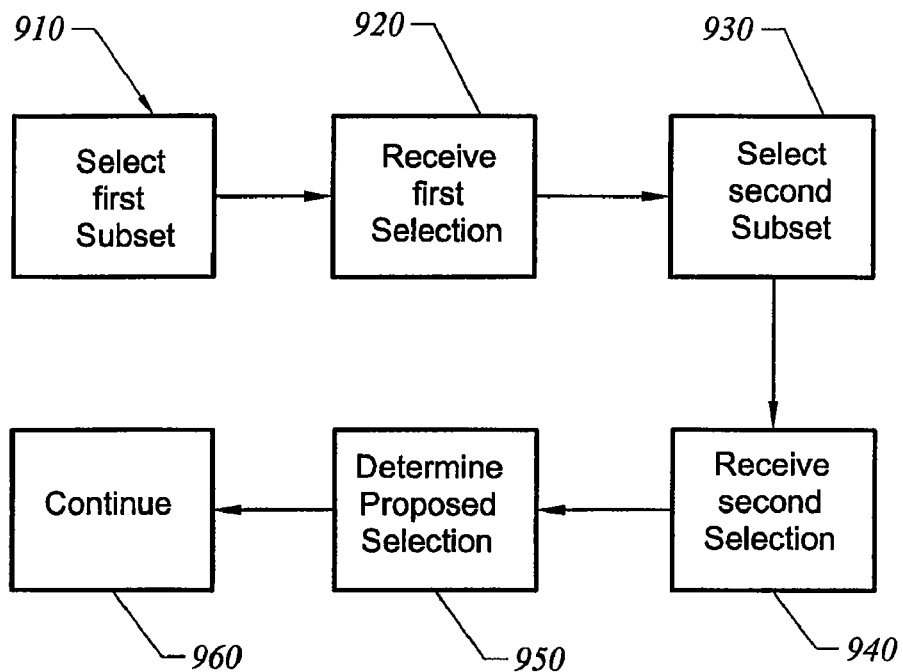
FIG. 17
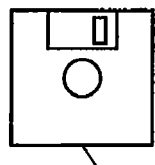
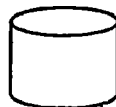
FIG. 18

ASYNCHRONOUS NETWORK COLLABORATION METHOD AND APPARATUS

CROSS-REFERENCES TO RELATED APPLICATIONS

The present application is a continuation-in-part of U.S. application Ser. No. 09/416,143, filed Oct. 12, 1999, which is a continuation of U.S. application Ser. No. 08/657,984, filed Jun. 4, 1996, now issued as U.S. Pat. No. 5,995,951. The present application further claims priority to U.S. Provisional Application No. 60/317,895, titled Asynchronous Network Collaboration Method and Apparatus, filed Sep. 7, 2001, which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to network collaboration. More specifically, the present invention relates to methods and apparatus for enabling network resource groups to collaborate in decision making. Network resource groups include groups of users interconnected by a common computer network.

Current approaches to problem solving have focused upon decision making by individuals or have focused upon the principles of discovery and intuition in order to create solutions. Such approaches typically guide the user through a series of steps that focus the user's attention upon conceptual solutions the user may be overlooking. For example, one approach identifies contradictions between objectives within a user's project and highlights them to the user, another approach uses word association games to attempt to spur creativity in the user, another presents unexpected scenarios to the user to attempt to stimulate creative solutions from the user, yet another utilizes neural networks to attempt to generate alternative solutions to the user, and yet others guide the user to make decisions based upon options and criteria set by the user. Each of these approaches attempt to aid the user in solving problems. None of these approaches, however aid groups of users in making decisions about which solution among possible solutions to a problem should be used.

What is needed are methods and apparatus for enabling groups of users to collaborate in decision making.

BRIEF SUMMARY OF THE INVENTION

The present invention discloses methods and apparatus for enabling groups of users to collaborate in decision making.

According to one embodiment of the present invention a method for a computer system including a memory includes storing a plurality of statements in the memory, selecting a first subset of statements from the plurality of statements, sending the first subset of statements to a first user at a computer client, and receiving a first selection of statements, the first selection of statement selected from the first subset of statements by the first user. The technique may also include selecting a second subset of statements from the plurality of statements in response to the first selection of statements by the first user, sending the second subset of statements to a second user at a computer client, and receiving a second selection of statements, the second selection of statement selected from the second subset of statements by the second user. Determining a proposed selection of statements from the plurality of statements in response to the first selection of statements by the first user and to the second selection of statements by the second user, and sending the proposed selection of statements to a third user are also contemplated.

Further understanding of the nature and advantages of the invention may be realized by reference to the remaining portions of the specification and drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which:

FIGS. 16A–G illustrate examples of embodiments of the present invention;

FIG. 17 illustrates a flowchart according to an embodiment of the present invention; and FIG. 18 illustrates various computer-readable media containing computer programs that implement embodiments of the present invention.

DETAILED DESCRIPTION OF THE INVENTION

Definitions

Research network collaboration device—a mechanical, electronic, or computational device which manages the communication and collaboration process between members of a research network and retains the information produced by a research network.

Research network—a group of people or groups collaborating in the solution of a problem or explanation of phenomena.

Statement—the elements out of which proposals are constructed. Statements may be text as in a natural language, symbolic formulae (such as logical formulae, mathematical formulae, or computer code or computational formulae is any computer language), musical notation, sound recordings or other musical or audio format, or images (such as line drawings, graphical designs, photographs, video images or recordings, or motion pictures of any sort). Statements may also be commands to execute other computer programs or to use and control peripheral devices coupled to the computer system.

Proposal—group of one or more typically separate and identifiable statements which contribute to: a solution of a problem, an explanation of specified phenomena, or a creation of a desired collaborative product.

Compilation—selection of one or more statements from one or more proposals into a list for use in constructing a new proposal(s).

Crossover—the combination of one or more compiled statements to form a new proposal Ranking—placing a list of proposals or statements into a list in descending order from best to worst in its fitness to solve a problem or explain phenomena and selecting a predetermined number of these proposals or ideas to be used in the combinatorial process of creating new proposals or in creating a synthesis.

Synthesis—selecting a predetermined number of ideas from a predetermined number of proposals and placing them in a rank ordered list according to their fitness to solve a problem or explain phenomena.

Round—a round is a process of presenting proposals to members of a research network, compiling statements from the proposals presented, creating new proposals through crossover, and ranking proposals or statements to determine which proposals will proceed to the next round of consideration.

Research project—a collaborative process by members of a research network designed to solve a particular problem or explain particular phenomena which consists of round one, round two, round three, and a synthesis.

Research network member—a person or group of people that is a member of the research network.

Research team—members of a research network who collaborate to make a proposal.

System Overview

Figure 1:
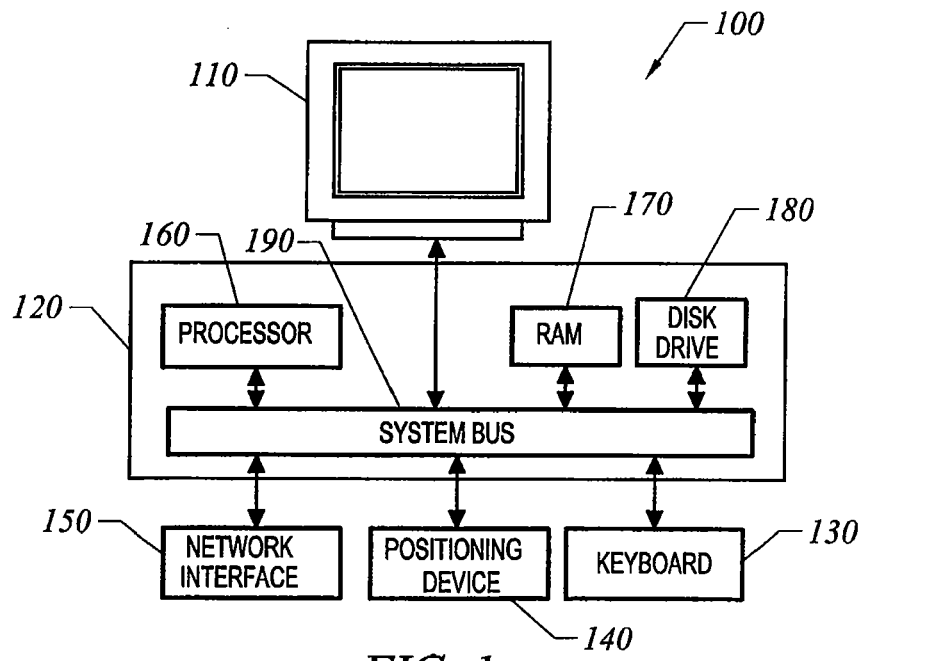
FIG. 1 is a block diagram of a system according to a preferred embodiment of the present invention.

FIG. 1 is a block diagram of a system 100 according to a preferred embodiment of the present invention. System 100 includes a monitor 110, a computer 120, a keyboard 130, a mouse 140, and a network interface 150. Computer 120 includes familiar computer components such as a processor 160, and memory storage devices, such as a random access memory (RAM) 170, a disk drive 180 (optional), and a system bus 190 interconnecting the above components.

A mouse is but one example of a graphical input device, also known as a pointing device, a digitizing tablet is another. RAM 170 and disk drive 180 are examples of tangible media for storage of computer programs, JAVA or ActiveX applets, statements, groups of statements, and data associated therewith, embodiments of the present invention, and the like. Other types of tangible media include floppy disks, removable hard disks, optical storage media such as CD-ROMS and bar codes, semiconductor memories such as flash memories, read-only-memories (ROMS), ASICs, battery-backed volatile memories, and the like.

Network interface 150 enables the user to communicate with other users in the decision making process. In the present embodiment, network interface 150 may be embodied as a telephone modem, DSL modem, cable modem, satellite modem, 10BaseT or 100BaseT network interface card, wireless modem, or the like.

In an one embodiment, System 100 includes an x86-based computer such as an Athlon™ from AMD or PentiumIV from Intel, running a version of the Windows operating system, or any other operating system such as LINUX, a PowerPC-based Macintosh-compatible computer, running MacOS, or the like. Also included are web browsing software such as Netscape Communicator, Windows Explorer, or the like. Additionally, JAVA (TM) interpreters or compilers, such as HOT JAVA (™) from Sun Microsystems, and Resolution (™) software from the inventor are contemplated.

FIG. 1 is representative of but one type of system for embodying the present invention. It will be readily apparent to one of ordinary skill in the art that many system types and configurations are suitable for use in conjunction with the present invention, such as Workstations, Network Computers, Network appliances, portable devices such as cellular telephones, PDA, and the like. Embodiments may include the use of Java (TM), or other cross-platform language supported systems.

Figure 2:
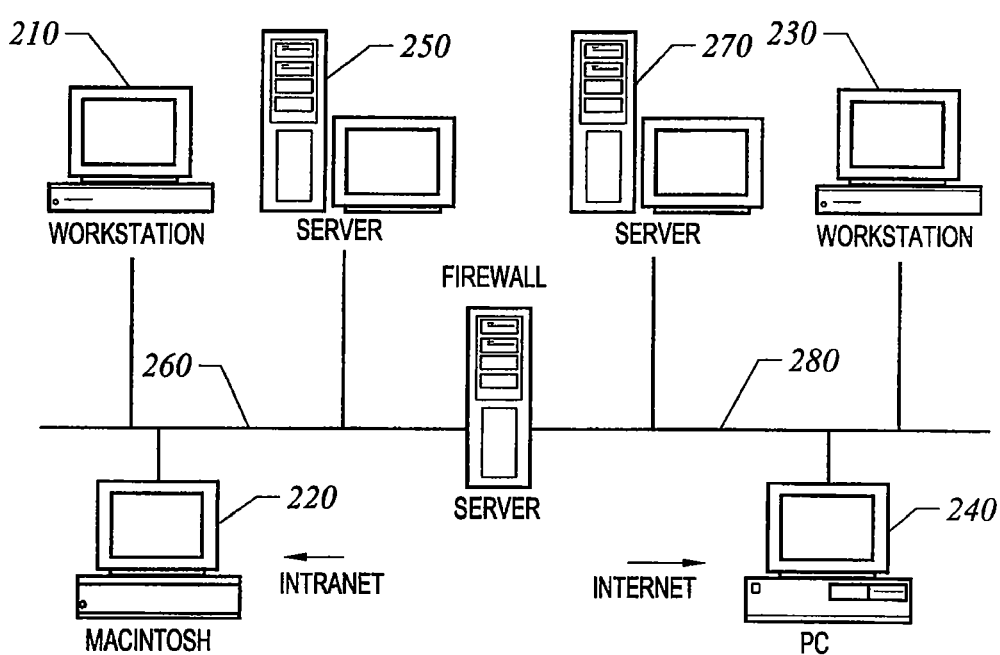
FIG. 2 is a block diagram of a network according to a preferred embodiment of the present invention.

FIG. 2 is a block diagram of a network 200 according to a preferred embodiment of the present invention. FIG. 2 illustrates clients 210–240, central server 250 coupled to a network 260, and central server 270 coupled to a network 280. Each client 210–240 and central servers 250 and 270 may be a computer system as described in FIG. 1.

In the present invention, "the central server" may be a web server (central server 250) within an enterprise (Intranet, network 250) or an external web server (central server 270) external to the enterprise (Internet, network 280). In FIG. 2, either the central server 250 or central server 260 may be used in the preferred embodiment, so long as clients 210–240 have access to the web server embodying the present invention.

In alternative embodiments, the invention may be embodied on web server 250 and only be accessible to users 210 and 220. Further, an embodiment may be embodied on web server 270 and only be accessible to users 230 and 240.

FIG. 2 is representative of but one type of network for embodying the present invention. It will be readily apparent to one of ordinary skill in the art that many other network configurations are suitable for use in conjunction with the present invention.

Detailed Description

Figure 3:
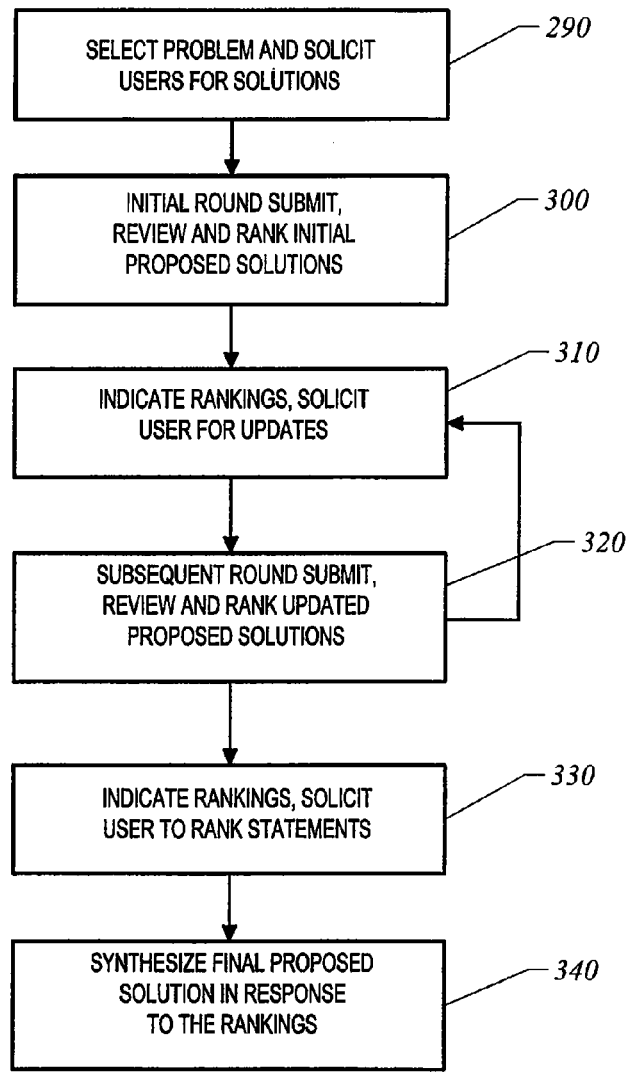
FIG. 3 illustrates a flow diagram of the preferred embodiment of the present invention.

FIG. 3 illustrates a flow diagram of the preferred embodiment of the present invention. FIG. 3 includes steps 290–340.

Initially a user selects a problem to be solved and solicits initial proposed solutions from a group of network users, step 290. These proposed solutions, like subsequent proposals, include a number of statements. The network users are preferably coupled to an intranet or by the Internet, as previously described.

Next, in an "Initial round," the network users submit, review, and rank the initial proposed solutions, step 300. A certain number of the initial proposed solutions are then selected for further refinement and consideration, based upon the rankings.

The selected initial proposed solutions are indicated to the network users and the network users are solicited to update particular initial proposed solutions, step 310.

Next, in a "Subsequent round," the network users submit, review, and rank the proposed solutions, step 320.

As indicated in FIG. 3, steps 310–320 may be repeated any number of times. The number of iterations may be based upon the number of initial proposals. For example, if there are a great number of initial proposals, paring down to a "manageable" number of proposals may take a few iterations. In one example, starting with five proposals, two iterations of the above steps are performed to reduce the number of proposals to two.

After the number of proposals has been reduced to a "manageable" number, typically two, the network users are solicited to rank statements from within each of the remaining proposals, step 330.

In response to the rankings, a final proposed solution is synthesized, step 340. The final proposed solution may contain any number of statements, consolidated from statements within proposals.

Figure 4:
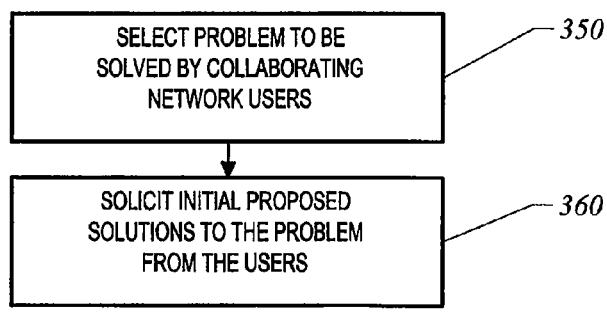
FIG. 4 illustrates a more detailed flow diagram of step 290 in FIG. 3.

FIG. 4 illustrates a more detailed flow diagram of step 290 in FIG. 3. FIG. 4 includes steps 350 and 360.

Initially, a user selects a problem to be solved by network users collaborating in decision making, step 350. The problem may be determined by an individual such as a project manager, or by other conventional means, such as a committee. Network users may be individuals or a team of users.

Next, the preferred embodiment of the present invention, embodied on a central server, solicits initial proposed solutions from the network users, embodied at remote clients, step 360. Preferably the central server solicits initial proposed solutions from the entire group of network users that will collaborate in decision making. Alternatively, however, the central server may solicit proposals from fewer than all of the network users in certain cases (e.g. only solicit proposals from a research and development group).

Figures 5, 6:
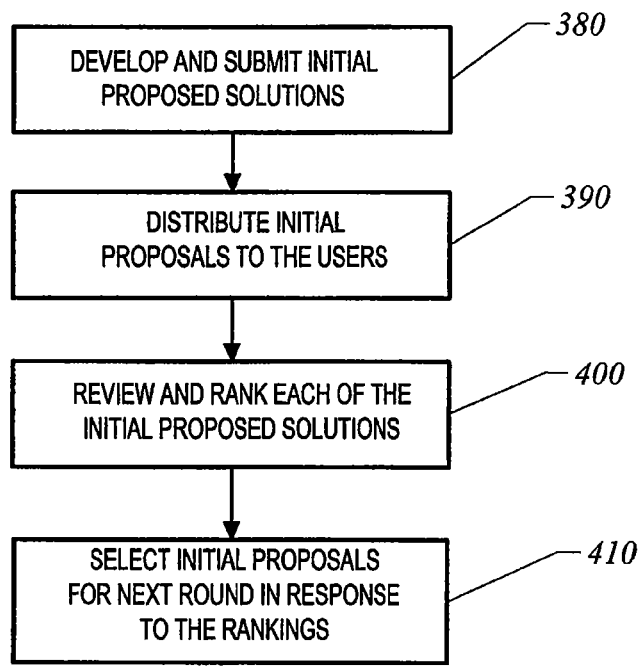
FIG. 5 illustrates a configuration screen display of an embodiment of the present invention.
FIG. 6 illustrates a more detailed flow diagram of step 300 in FIG. 3.

FIG. 5 illustrates a configuration screen display of an embodiment of the present invention.

In the preferred embodiment of the present invention, the remote clients contact the central server, which in turn loads the illustrated screen displays on the client side machine. Within this configuration screen, a decision maker defines a name for the project, and defines the number of participants in the network collaboration group. Using well-known techniques, the project manager specifies which users will participate by user name or number, with another input screen (not shown). The decision maker also specifies an amount of time given to each participant to submit proposals, to update proposals, to rank the proposals, etc, as will be further seen the attached figures.

FIG. 6 illustrates a more detailed flow diagram of step 300 in FIG. 3. FIG. 5 includes steps 380–410.

In response to the described problem, each of the network users develop and submit initial proposed solutions to the central server, step 380. The network users may be individual users of teams of users. At this stage, it is envisioned that initial proposals would typically include a brief list of points or statements, as well as supporting comments and/or justifications. Initial and subsequent proposals, however, may be in any level of detail for use in the present invention.

Figure 7:
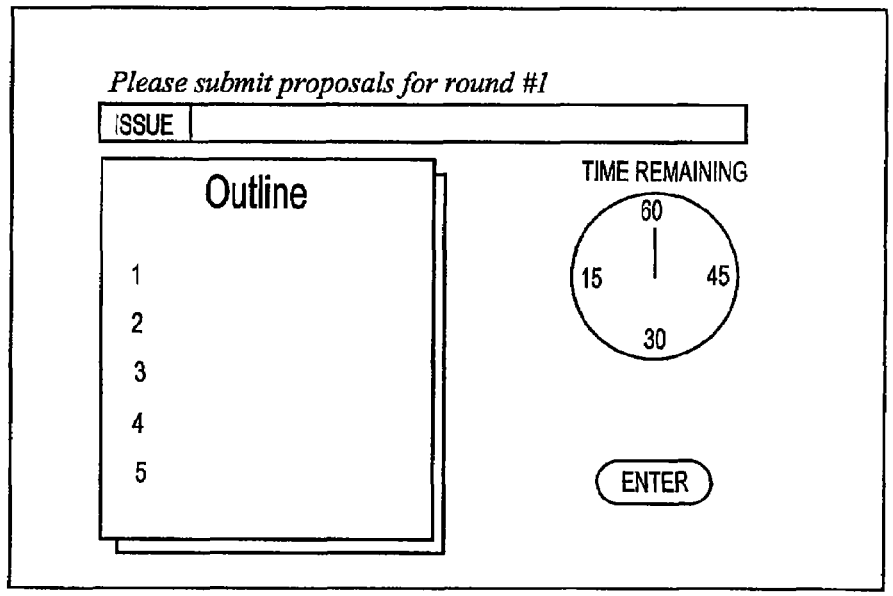
FIG. 7 illustrates a submission screen display of an embodiment of the present invention.

FIG. 7 illustrates a submission screen display of an embodiment of the present invention. As illustrated, the central server prompts the user to enter a proposal to solve the problem. Typically the user enters statements, with comments in another display screen.

FIG. 7 also illustrates a time remaining clock that specifies the amount of time remaining before the proposal is due. In one embodiment of the present invention, the clock is implemented as a Java-language applet.

Referring back to FIG. 6, after the users have submitted the initial proposals to the central server, the central server distributes some or all of the initial proposals to each of the users, step 390. Alternatively, the central server may notify the users that proposals are available for review at a particular location, such as a web site. The central server may use any well known notification method such as e-mail. Preferably all of the users are distributed a copy of each of the initial proposals.

Next, each user reviews and ranks each of the initial proposed solutions to the problem, step 400. Based upon the user rankings, the central server selects a number of initial proposals that will proceed to the next round, step 410. Preferably fewer than all of the proposed solutions proceed to the next "round" (step 300). Alternatively, all of the proposed solutions proceed to the next "round". It should be recognized, however, that generally the greater the number of proposed solutions that proceed to subsequent "rounds" the greater the amount of time it will take to come to a final proposed solution.

Figure 8A:
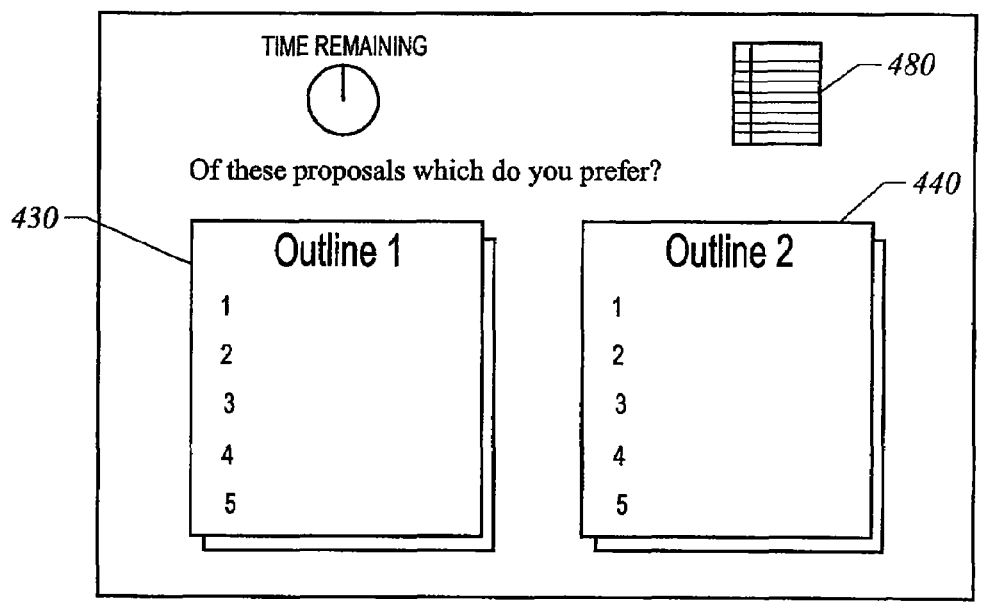
FIG. 8a and 8b illustrate comparison screen displays of a preferred embodiment of the present invention.

FIGS. 8*a* and *b* illustrate comparison screen displays of a preferred embodiment of the present invention. In FIG. 8*a*, the central server presents a first initial proposed solution 430 next to a second initial proposed solution 440. The user obtains further detail on any of the statements in the outline by selecting the statement on the display with a conventional pointing device. The user then votes for one of the initial proposals over the other one by using the pointing device to select the preferred initial proposal.

Figure 8B:
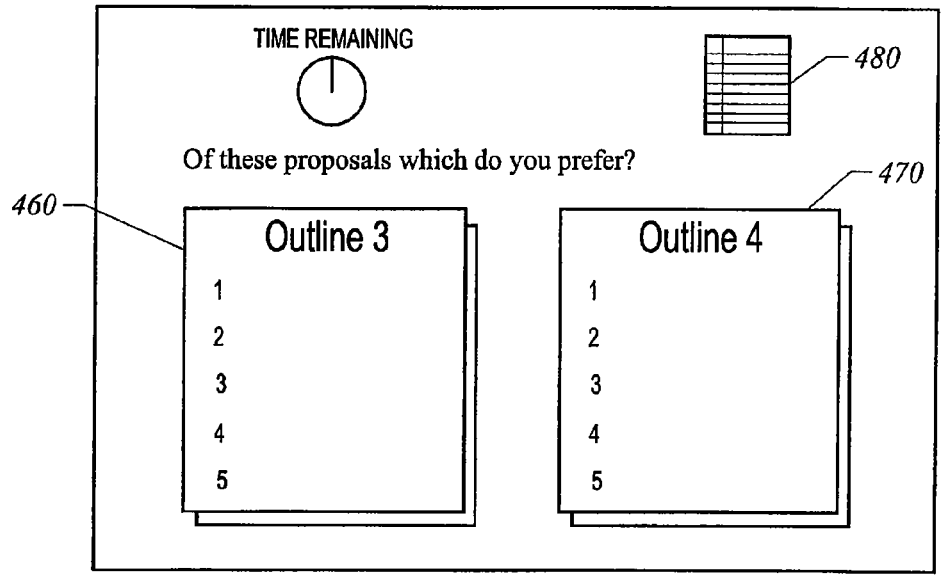

In FIG. 8*b*, the central server presents a third initial proposed solution 460 next to a fourth initial proposed solution 470. The central server displays pairings of the initial proposals in a round-robin fashion, until the user has indicated the user's preferences for all of the possible pairings of initial proposals.

Based upon the user's votes, the central server determines the rankings of the initial proposals. In an alternative embodiment, the central server may simply ask the user to directly assign a ranking to each of the proposed solutions, without the side-by side displays illustrated above in FIG. 8*a* and 8*b*.

In determining which initial proposals proceed to the next step, the central server may use many different schemes based upon the users' rankings. For example, in one embodiment, the three initial proposals receiving the most number of first place votes proceed to the next "round." Alternatively, the central server may compute an average ranking value for each initial proposal, based upon the mean, or median user ranking. Then, based upon this average ranking value, the central server may select a number of initial proposals having the highest average ranking value to proceed to the next "round." Other types of schemes are easily foreseeable and are included in alternative embodiments of the present invention.

FIG. 8*a* and b further illustrate a notebook icon 480. Notebook icon 480 enables users to store and "borrow"

ideas from the other proposals the user has reviewed. When reviewing a proposal, if the user likes an idea from another proposal, the user uses a conventional pointing device, such as a mouse, to select a statement from one of the proposals, and drags the statement to notebook icon 480. When the user subsequently selects notebook icon 480, during any of the steps described herein, the list of the statements saved is returned. As also illustrated, the ranking process may have a set time limit to respond.

Figure 9:
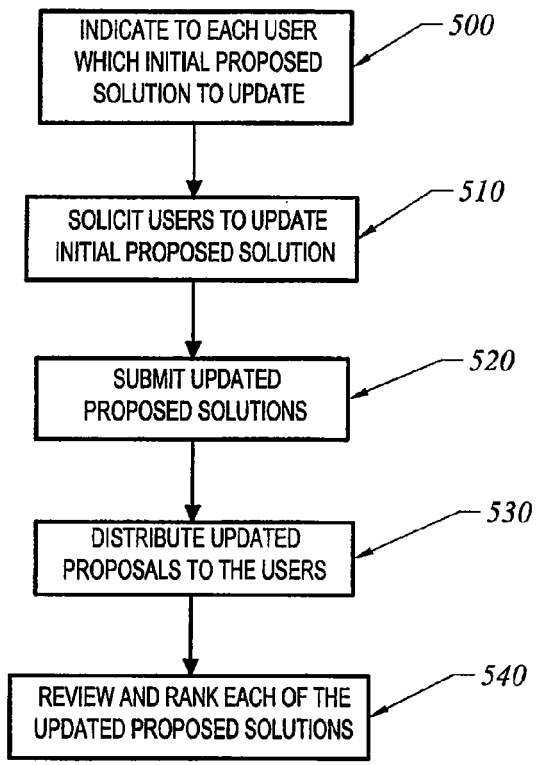
FIG. 9 illustrates a more detailed flow diagram of step 310 in FIG. 3.

FIG. 9 illustrates a more detailed flow diagram of step 310 in FIG. 3. FIG. 9 includes steps 500–540.

Initially the central server notifies each user as to the user's highest ranked initial proposed solution that survived to this stage, step 500. The central server then solicits the user to update or modify that proposal, step 510.

Next, the users revise and submit updated proposals to the central server, step 520. Typically it is envisioned that users will borrow "good" ideas (statements) from other proposals the users have reviewed, and incorporate them into the proposal. Because typically more than one user will update a particular initial proposed solution, more than one updated proposal for each initial proposed solution will exist.

Figure 10:
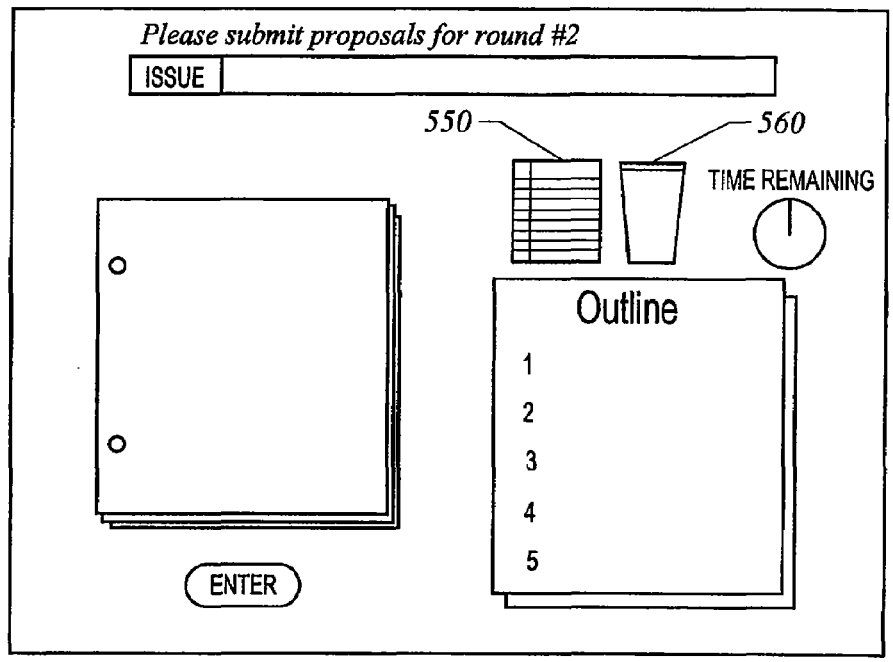
FIG. 10 illustrates a display screen of a preferred embodiment of the present invention.

FIG. 10 illustrates a display screen of a preferred embodiment of the present invention. The user may add new statements via conventional means such as a computer keyboard. Further, the user may copy ideas previously stored in notebook 550 by dragging statements onto the current proposal, and the user may throw away statements by dragging statements onto trash can 560.

Referring back to FIG. 9, after the users have submitted updated proposals, the central server distributes the different updated proposals for each particular initial proposal, step 520. Preferably the central server distributes the updated proposals for an initial proposal only to those users that updated that particular initial proposal, step 530. If a user is the only user updating a particular initial proposal, the user may further update the proposal at this stage.

Figure 11:
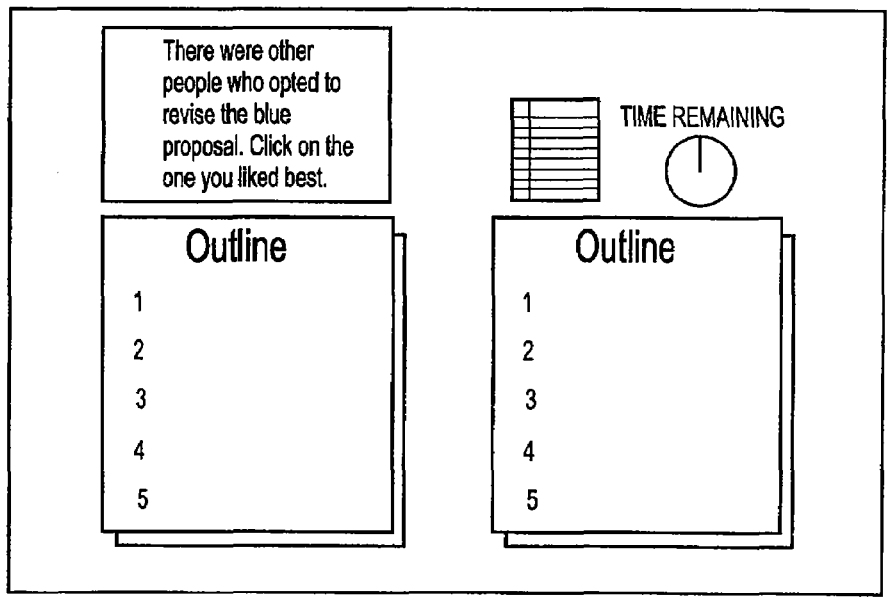
FIG. 11 illustrates a display screen of a preferred embodiment of the present invention.

Next, each user reviews the different updated proposals for the particular initial proposed solution and then ranks the different updated proposals, step 540. The process of ranking different updates to the same initial proposal may occur in a process similar to that described above. This is illustrated in FIG. 11 as a display screen of a preferred embodiment of the present invention.

Figure 12:
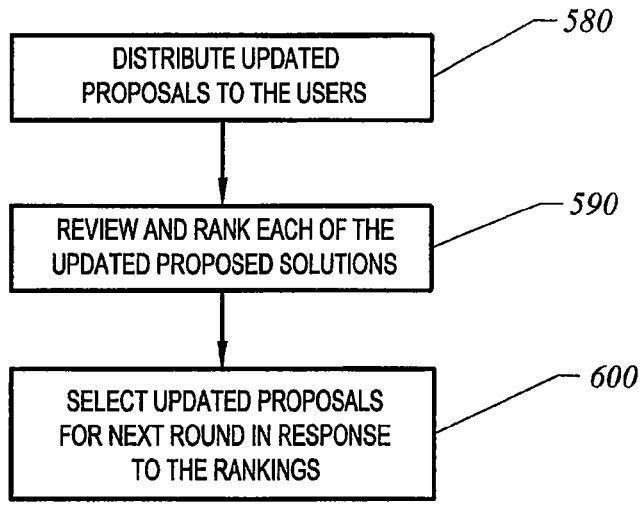
FIG. 12 illustrates a more detailed flow diagram of step 320 in FIG. 3.

FIG. 12 illustrates a more detailed flow diagram of step 320 in FIG. 3. FIG. 12 includes steps 580–600.

Based upon the user rankings, the central server selects one updated initial proposal as an updated proposal for each initial proposal. The central server then distributes updated proposals to all of the users, step 580.

After the users review each of the updated proposed solutions, the users rank each of the updated proposals, step 590. Again, based upon the users' rankings, the central server selects a number of updated proposals to proceed to the next step, step 620.

Figure 13:
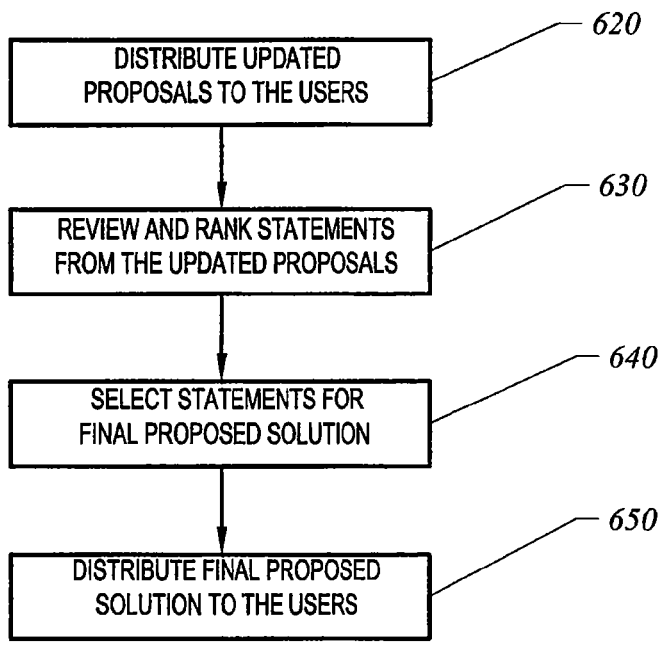
FIG. 13 illustrates a more detailed flow diagram of steps 330 and 340 in FIG. 3.

FIG. 13 illustrates a more detailed flow diagram of steps 330 and 340 in FIG. 3. FIG. 13 includes step 620–650.

Initially the central server notifies the users which proposed solutions reach this stage, step 620. Next each user reviews statements from each of the remaining proposed solutions and selects statements for the "final" proposal, step 630. Preferably the user selects some but not all of the statements. In a preferred embodiment, the central server makes the users rank the statements, as was previously described.

Figure 14:
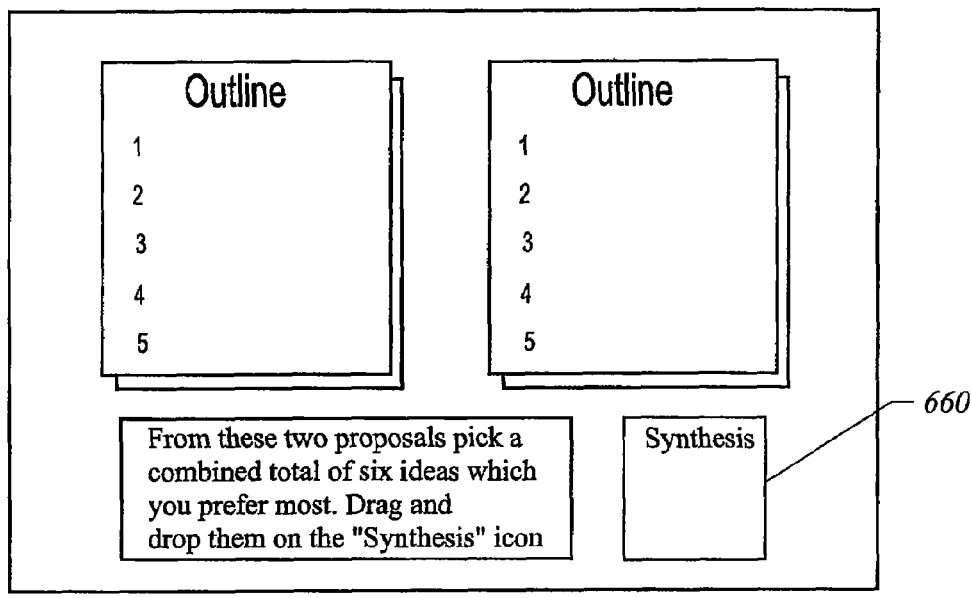
FIG. 14 illustrates a selection display screen of a preferred embodiment of the present invention.

FIG. 14 illustrates a selection display screen of a preferred embodiment of the present invention. As illustrated, the central server prompts the user to select some but not all of the statements. Preferably, the user uses the mouse to select a statement, and to drag the statement to synthesis icon 660.

Referring back to FIG. 13, based upon the users selections, the central server selects a predetermined number of statements for the "final" proposed solution, step 640. The number of statements may vary from one to all of the statements. The number of statements in this proposal is user definable, depending upon application.

Finally, the central the central server distributes the final proposed solution to the users, step 650. It is envisioned that the "final" proposed solution produced by network collaboration may simply be a working proposal for further study or a proposal for implementation.

Figure 15:
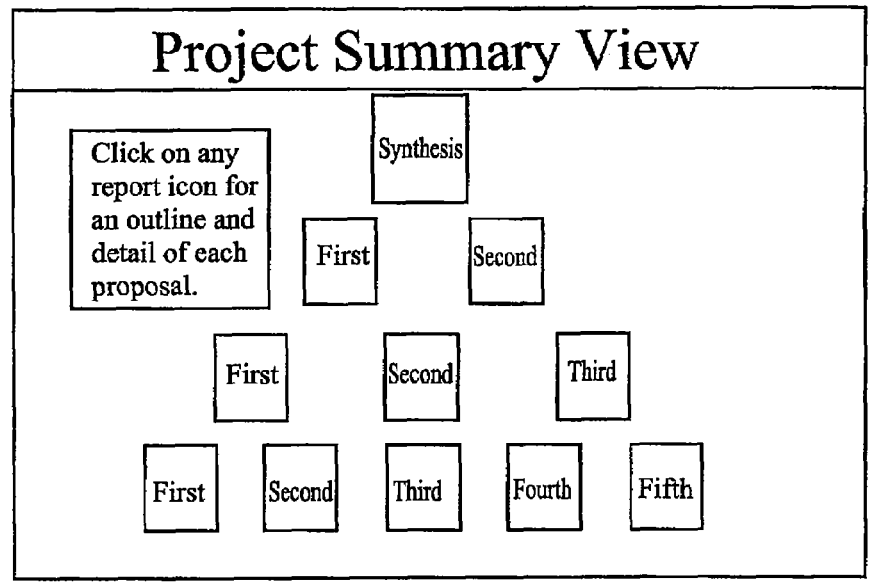
FIG. 15 illustrates an exemplary diagram of the preferred embodiment of the present invention.

FIG. 15 illustrates an exemplary diagram of the preferred embodiment of the present invention. As illustrated, in the initial round the central server receives five initial proposed solutions. From these five initial proposed solutions, the central server selects three proposals for further refinement, in response to the users' rankings. Next, the users update each of the three proposals, and the central server distributes the three updated proposals to all of the users. The users then update and rank the three updated proposals. Once two updated proposals remain, the users select statements from the two updated proposals for synthesis. The central server processes the users' rankings of the statements and then synthesizes a final proposed solution.

FIGS. 16A–G illustrate examples of embodiments of the present invention. In particular, FIGS. 16A–G illustrate an example of the present invention allowing users to collaborate to suggest solutions to a problem. In this case, the research project is applied to marketing phenomenon. Marketing phenomena may include, for example, why a consumer likes a product, why a consumer dislikes a product, what features the consumer would like added to a product, what items are important to the consumer, what features are unimportant to the consumer, what colors/appearances the consumer prefers, what options and or packages appeal to the consumer, and the like. Answers to many other types of marketing phenomena may also be determined, and are envisioned in alternative embodiments.

FIG. 16A illustrates a user display according to an embodiment. In particular, FIG. 16A illustrates a screen capture of a web page as it appears to a user in a typical web browser in a client computer.

As illustrated in the example in FIG. 16A, the marketing phenomena to be determined is what users would like to add to a particular car, 700. FIG. 16A includes a number of user selectable statements, 710 and a place to enter new statements 720.

In the present embodiment, it is contemplated that a great number of statements from other users may already exist in a web server, for example, 100 different statements may already be entered. However, because it is impractical to believe users will willingly make selections from the 100 statements, a subset of statements or a reduced number of statements is selected for each user. In the example in FIG. 16A, only eight user selectable statements 710 are presented to a user. The technique of selecting the subset of statements from the larger list of statement will be discussed below.

FIG. 16B illustrates a user selection of statements from subset of statements 710 selected by the user. In this embodiment, the user selects statements that answer the marketing phenomena being asked (700). In FIG. 16B, visual indicators are used to visually illustrate the user's selections 740. In the present embodiment, the user may indicate her selection via clicking upon an empty box with a user input device, such as a mouse or the like.

In this embodiment, the user finalizes her selections by clicking on a "next" icon 750. Alternatively, the process may automatically proceed to the next step after a predetermined number of selections have been selected. As an example, after 5 selections, the selections may automatically be submitted to a server computer. The predetermined number is typically less than all of the statements presented to the user.

FIG. 16C illustrates the user selection of statements from FIG. 16B from the subset of statements 710 in FIG. 16A. In FIG. 16C, the statements are typically ordered in the order they were presented in the list in FIG. 16A. However in alternative embodiments, the order may be changed from the order of appearance in the list in FIG. 16A.

In the present embodiment, the user is prompted to rank or prioritize her selections. In alternative embodiments, user rankings are not required, and this user display, as well as the next one, are not presented to the user.

In this embodiment, to change the rank of a statement, the user selects a statement and selects a promote icon 770 or a demote icon 780. In alternative embodiments, the user may simply click first on the most important statement, click on the next highest priority statement, and so on, until all the statements are selected. Alternatively, only a predetermined number of statements may be ranked, for example, only the top three need to be ranked.

As illustrated in the example in FIG. 16D, statement 790 was promoted to the top rank. If the user is satisfied with her selections and rank, she submits her selections back to the server. The selections of the statements by the user as well as the rank given by the user are stored in the server memory.

After submission of the user's selections, as illustrated in FIG. 16E, the user may see what statements 810 other users have selected and ranked highly. In embodiments of the present invention it is contemplated that a great number of users will review various subsets of the statements in the memory and rate them. Thus as an aggregate, a good number of the statements will be reviewed by different users, and a good number of the statements will have an equal chance to be selected and ranked in the different subsets of statements presented to different users.

The most popular or top statements are then be determined by calculating the number of times particular statements were selected by users, and the rank given by the users. Various methods of weighting the selection and rank factors may be used in determining the "top" statements. As an example, a threshold number or percentage of user selections may first be applied to the user selections. Next, the average ranking of the selection may then be determined and used for aggregate ranking. For example, to be considered for a "top" statement list, statements may have to be selected by users 100 times, may have to be selected by at least 1% of all users, may have to be selected by at least 50% of users who are presented with the selection, or the like. If a statement is considered, the aggregate or average ranking of the statement may be computed by averaging the numerical ranking given by the users who ranked that statement, and the like.

In one embodiment, different weights may be given to different users based upon demographics. As an example, users within a targeted demographic may be given a heavier weighting compared to the remaining users. For example, a product may be targeted at women from 18–24, thus, selections and rankings of users meeting this demographic profile may be given the equivalent of two or three times the selection and ranking power compared to male users, or women users outside that age group. In other embodiments, three or more different weightings may be provided.

In the present embodiment, a report of the current highest ranked statements may be presented to a marketing department. In this example, a report may include more than simply 5 statements, for example the report may include the highest 20 or 30 statements, all the statements, or other subsets. Such a report would be a proposed answer to the marketing phenomena queried.

In an alternative embodiment, the list of statements 810 illustrated in FIG. 16E may not truly reflect the highest ranked statements. Instead, statements 810 may represent "massaged" or edited data. In such a case, the true data would still be contained within the report to marketing, or the like.

FIG. 16F illustrates a display of a second user accessing the same web page as in FIG. 16A. The web page illustrated in FIG. 16F is directed to the same marketing phenomena 700, as in FIG. 16A.

In this embodiment, as illustrated, the subset of statements 830 is different from the subset of statements 710. For example, statement 840 only appears in FIG. 16F, and statement 730 appears only in FIG. 16A.

As will be described below, in some embodiments, the statements within each subset are randomly selected, whereas in some other embodiments, the statements included in subset include statements that other users have selected and rated highly. For example, statement 850 appears in FIGS. 16A and 16F, and is the highest rated statement in FIG. 16E.

In other embodiments, the number of statements in 830 and 710 may be the same or different. For example, in one case, the number of statements may be a fixed number, e.g. six, seven, and in another case, the number is randomly selected from a pre-determined range, e.g. 5 to 10, for each user, or the like.

Further, in this embodiment, the position of statements within the list of statements is typically randomly assigned. This function is performed to ensure that statements are not selected and ranked highly by users simply due to the position within list 710, 830, or the like.

FIG. 16F also includes user entered statement 860. As illustrated in FIG. 16F, users may also enter new statements in box 870 if the user does not see a statement she likes in subset 830. In this embodiment, it is contemplated that a previous user entered statement 860 into box 870, for example, in FIG. 16G. The new statement is added to the list of statements stored in a memory on the server. The new statement can then be included in subsets of statements presented to subsequent users.

In one embodiment of the present invention, the user entered statements may automatically be put into the list of statements. In an alternative embodiment, the user entered statements may be edited by a moderator (or the like) or approved by a marketing department (or the like) before it is added to the list of statements. As discussed above, once the new statement has been edited or approved, it may be selected by the server for inclusion into subsets of statements presented to subsequent users.

After FIG. 16F, the second user may also select and prioritize statements the user agrees with. Again, in response to the user's selections and rankings, the server will update the statistics for the statements by indicating the number of selections and/or the ranking of such statements.

It is envisioned that the above process is repeated for each subsequent user. At any time, after the respective server database becomes updated, a marketing department (or the like) may also get a proposed solution—or an updated list of the most "popular" statements—that explains the desired phenomenon.

As mentioned above, numerous methods are contemplated for selecting the subsets of statements that users can vote upon in each round. In one example, all users within a round see all statements and can rank them. This example was explicitly described above in FIGS. 3–15.

In another example, mentioned above, in one round, users get random subsets of statements (e.g., 10 statements) from the entire pool of statements (e.g., 100 statements). The users then select and rank statements from the subset they are presented with. Because it is contemplated that many users will collaborate together and select and/or rank statements, in the aggregate, all statements from the entire pool of statements (e.g., 100) will be presented and evaluated by many users in that round. At the end of the round, a proposal could be synthesized to include statements that were highly rated by the different users.

In yet another example, mentioned above, statements that were previously rated by users will have a higher probability of being included into a subset of statements for subsequent users. In such and example, input from each individual user may be placed into a separate "round." An example of this was illustrated by the inclusion of statement 850 in FIGS. 16A, 16F, and 16G.

In such an example, a pool of statements may have been previously defined, for example 100 statements, may have been provided by a group, a department, an individual, or the like. Each statement is then assigned "entries" into a "lottery." When determining statements to be included into a subset of statements for a particular user, these entries are selected in this "lottery." When an entry is "selected", the corresponding statement is included into a subset of statements.

Initially, all statements are given the same number of "entries," for example, 5 "entries." Therefore, for a first user, the chance of being presented by any random statement in a subset is equal, because the number of entries are equal. In this example, the first user selects statements from the subset of statements, as was illustrated in FIG. 16B. Next, based upon the selections of the first user, the statements that were selected are given additional "entries" into the lottery (e.g. an additional entry). This concludes one "round."

When selecting the subset of statements for the second user, the "lottery" selection process is repeated. In particular, the server computer selects random entries with the lottery. Next, statements associated with the entries are included into the subset of statements. In this case, because statements previously selected by the first user are given additional "entries," these statements will have a greater chance of being picked for the new subset. After the subset is presented to the second user, the second user may select statements she agrees with. Similar to above, based upon the selections of the second user, the statements that were selected are given additional "entries" into the lottery (e.g. an additional entry). This concludes another "round."

The process may continue for any number of "rounds" for the different users. As mentioned above, based upon respective users' selections, additional "entries" may be given to user selected statements. At particular times, a marketing department, or the like may ask the server to list X number of selected statements based upon the number of "entries" associated therewith. For example, statements that are more popular with users in the different rounds should have an accordingly high number of "entries." Based upon this data, the marketing department may obtain a list of the most liked features of a product, most desired new feature of a product, most hated feature, and the like.

In other examples, when users rank statements, "entries" may also be awarded based on the rank of the selected statements. For example, a first ranked statement may get ten additional entries; a second ranked statement may get six additional entries; a third ranked statement may get three additional entries; unranked statements may get one additional entry; and the like. The selection of the number of entries, coefficients, is within ordinary skill in the art based upon mathematical theory, trial and error, and the present patent disclosure.

In this example, it is expected that the larger the disparity among additional entries for the first ranked statements, the remaining ranked statements, the unranked but selected statements (if any), and the unselected statements, the quicker highly valued statements can be identified. That is, popular statement within a first round will more likely show up in a subset for the second round. If the statement is selected in the second round there is a greater chance for that statement to also appear in a subset for the third round, and so on. As a result, a report from the server to a marketing group (and the like) will typically have a higher disparity of entries between more popular statements an less popular statements.

In the case where users enter new statements within a round, the server must assign "entries" into the lottery so that the new statement is not completely buried. In the case where multiple users are included in round, all statements have the equal number of "entries," thus the new statement may be assigned the same number of "entries." In other embodiments, the number of entries may be decreased if the marketing people (or the like) are less concerned about users' inputs, or may be increased if the marketing people (or the like) are more concerned with users' inputs.

In the case where users are placed within separate rounds, after the first round, statements will typically have an unequal number of entries. Thus, in one embodiment, new user statements are given a number of entries approximately half way between the largest number of entries for a statement, and the smallest number of entries for a statement. As an example, a popular statement may have 100 entries, whereas an unselected statement may have 5 entries, thus, a new user statement may be given 50–55 entries into the lottery. In another embodiment, new user statements are given a number of entries approximately equal to entries of a particular statement. For example, from 100 statements, the statement with the 20th highest number of entries has 305 entries, thus new statements may be assigned approximately 300 entries. The selection of the number of entries, coefficients, for the new statement may be based upon mathematical theory, trial and error, and the present patent disclosure. Subsequently, the entries for the new statements need not be further adjusted, and are treated the same as the remaining pool of statements.

In specific implementations of the present invention, instead of "entries" into a "lottery," probabilities may be assigned to each statement. That is, each statement may be assigned a probability of being picked for a particular subset of statement. In the examples described above, the probabilities are fixed in one case, and the probabilities may be adjusted in another case. For example, when multiple users input selections within a round, it is contemplated that the probabilities for the statements are not adjusted. However, when users input selections within separate rounds, the probabilities may be adjusted. As an example, statements that are selected and highly ranked may have their probabilities increased for the next round. This is analogous to giving those statements more entries into the "lottery."

FIG. 17 is a flowchart summarizing the above-described process. A computer server (e.g., server 250 in FIG. 2) stores a plurality of statements in its memory (e.g., RAM 170 or disk drive 180 in FIG. 1). In step 910, the computer server 250 selects a first subset of statements from the plurality of statements. The first subset may be selected as described above or by any other selection criteria. The computer server 250 then sends the first subset to a user at a computer client (e.g., workstation 210 in FIG. 2). The user generates a first selection from the first subset of statements. This first selection may involve the user associating rating values, or relative rankings, or other preferential or negative indications to the statements in the first subset. The user then sends the first selection back to the computer server 250. In step 920, the computer server 250 receives the first selection.

In step 930, the computer server 250 selects a second subset of statements from the plurality of statements. This selection is made in response to the first selection performed by the user. That is, the user's first selection influences what statements appear in the second subset. The second subset may be selected as described above regarding the "entry" or "lottery" process, or by a similar sort of weighing process, or by any other selection criteria that takes into account the first selection made by the user. The computer server 250 then sends the second subset to another user at a computer client (e.g., PC 240 in FIG. 2). The second user generates a second selection from the second subset of statements. This second selection may involve the second user associating rating values, or relative rankings, or other preferential or negative indications to the statements in the second subset. The second user then sends the second selection back to the computer server 250. In step 940, the computer server 250 receives the second selection.

In step 950, the computer server 250 determines a proposed selection of statements from the plurality of statements. This proposed selection is made in response to both the first selection of statements by the first user and the second selection of statements by the second user. That is, the first selection by the first user influences what statements appear in the proposed selection both directly and indirectly: Directly, by influencing what statements appear in the proposed selection, and indirectly, by influencing what statements appear in the second subset and are returned as the second selection by the second user. The second selection by the second user also influences what statements appear in the proposed selection.

In step 960, the process continues. To generate statistically significant results, the above-described steps should be performed for a third user, a fourth user, etc. by sending each subsequent user a subset of statements that was selected based on previous users' selections. As more and more users make selections, the resulting information in the computer server 250 will grow closer and closer to a statistically accurate representation of the true worth of all the statements. The results may be viewed at any point, and the process may be stopped when a desired degree of statistical accuracy is reached, when the resulting information in the computer server 250 remains relatively unchanged (with respect to the representation of the true worth) over a defined period of time, when the resulting information in the computer server 250 remains relatively unchanged (with respect to the representation of the true worth) over a defined number of subsequent users, or at any other desired point.

FIG. 18 shows that a computer program implementing the above-described process may be embodied on a computer readable medium such as a floppy disk 1010, a hard disk 1020, or a memory 1030 (such as RAM, ROM, PROM, Flash, EEPROM, etc.). The computer program may include one or more code segments or subroutines that control the executing computer to perform various tasks. As these code segments are embodied as electrical or magnetic signals representing various values such as "1" and "0", they are assumed to be present on the various computer-readable media.

The process described above may be referred to as adaptive sampling. A study (contained in U.S. Provisional Application No. 60/317,895, titled Asynchronous Network Collaboration Method and Apparatus, filed Sep. 7, 2001, which is incorporated herein by reference) has determined the following benefits of the above-described adaptive sampling process:

1. It arrives at a ranking decision quickly, with surprisingly few survey responses required.

2. It is stable and repeatable, even though the ranking of ideas is the outcome of a random sampling process.

3. It correctly gives high rankings to the truly most important ideas.

4. It correctly gives low rankings to the truly unimportant ideas.

The study shows that the above-described process is highly efficient in its use of survey data to make inferences quickly. The study also shows that the inferences are repeatable, and that they would be similar with other randomly sampled groups. Therefore, the inferences exhibit a high degree of validity.

The above-described process implements a sampling scheme that selects a small number of ideas to be presented to a particular consumer by random sampling. Like any statistical sampling of consumers correctly applied, there will always be a small fraction of instances in which close calls go the wrong way. But in the same sense that one can say that ordinary FDA clinical trials of new medications are valid, or that ordinary public opinion surveying is valid, the study shows that one can say that the above-described process is valid.

In summary, the study shows that the above-described process, after analysis from numerous vantage points, including Monte Carlo Simulation and Mathematical Decision Theory, has proven to be an effective means of quickly and reliably producing a valid list of high priority ideas in a wide range of situations.

Conclusion

In the foregoing specification, the invention has been described with reference to specific exemplary embodiments thereof. Many changes or modifications are readily envisioned. For example, the number of proposals proceeding to subsequent rounds may be varied, depending on how quickly a decision is to be made, the users that the central server distributes proposals to, or that the central server takes rankings from may be different in each round, and the specific programming languages, network environment, and network configuration may be changed, among other changes. Further, in other embodiments, particular users may have "veto" power over proposals or statements within proposals and in other embodiments, statements can be voted upon at different stages.

The presently claimed invention applies to almost any area of decision making imaginable. For example, the proposals could be bids placed by contractors for a building contract or bids for the sales price of an object, commodity, or object as in an auction. In this case, the narrowing and refinement of proposals may be dictated by the judgments of the seller rather than the ranking of the bidders.

Also one can easily imagine the case that the proposals need not be limited to text alone. The proposals may consist of images or designs which are presented for the purpose of the collaborative designing, for example, advertisements, such as color schemes, layouts, textual or pictorial content, theme, etc., commercial designs such as logos, packaging, slogans, ergonomic design, etc., building design such as requirements, floorplans, aesthetic elements, etc. Alternatively, the proposal could be audio such as spoken text, sampled sounds, or musical notation or recorded music in the form of a audio samples, in "RealAudio" format, for example, or a MIDI file, etc. for the purpose of collaborative musical composition and/or analysis. Further the proposal could include images coordinated with audio for collaborative multimedia design, such as narration or accompanying music to a slideshow or a movie clip in the form of digital audio or video, or edit decision list (EDL) files including synchronization codes in SMTE or VITC format, for example, for controlling peripherals coupled to a computer.

The proposals could also consist of computational code in a computer language or any form of symbolic representation. Other examples of possible proposals are mathematical or logical formulae used in collaborative mathematical or logical problem solving. These examples are illustrative of the many types of collaborative projects and the various media that can be used in the proposed process. To reiterate, the presently claimed invention applies to almost any area of decision making imaginable. Further, having the central server maintain a list of actions taken by the users during the entire process may provide useful data.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a memory, comprising:
    storing a plurality of proposed-response statements in response to a humam-user query in the memory;
    selecting a first set of proposed-response statements from the plurality of proposed-response statements;
    sending the first set of proposed-response statements for sensory output to a first human user at a first computer client;
    sending the human-user query for sensory output to the first human user at the first computer client;
    receiving a first selection of proposed-response statements from the first computer client, wherein the first selection of proposed-response statements is selected from the first set of proposed-response statements by the first human user in response to the human-user query;
    selecting a second set of proposed-response statements from the plurality of proposed-response statements in response to the first selection of proposed-response statements by the first human user;
    sending the second set of proposed-response statements for sensory output to a second human user at a second computer client;
    sending the human-user query for sensory output to the second human use at the second computer client;
    receiving a second selection of proposed-response statements from the second computer client, wherein the second selection of proposed-response statements is selected from the second set of proposed-response statements by the second human user in response to the human-user query;
    determining a ranked set of proposed-response statements from the plurality of proposed-response statements in response to the first selection of proposed-response statements by the first human user and in response to the second selection of proposed-response statements byte second human user; and
    sending the ranked set of proposed-response statements for sensory output to a third human user at a third computer client.

2. The method of claim 1, wherein the second set of proposed-response statements includes the first selection of proposed-response statements.

3. The method of claim 1, wherein the second set of proposed-response statements includes at least one proposed-response statement from the first selection of proposed-response statements.

4. The method of claim 1, wherein the second set of proposed-response statements includes a proposed-response statement not within the first selection of proposed-response statements.

5. The method of claim 1, further comprising:
    receiving a new proposed-response statement from the first human user in response to the human-user query; and
    adding the new proposed-response statement to the plurality of proposed-response statements in the memory.

6. The method of claim 5, wherein the second selection of proposed-response statements includes the new proposed-response statement.

7. The method of claim 1, wherein determining the ranked set of proposed-response statements comprises:
    selecting proposed-response statements from the first selection of proposed-response statements and the second selection of proposed-response statements.

8. The method of claim 1, wherein determining the proposed selection of proposed-response statements comprises:
    selecting proposed-response statements that are both within the first selection of proposed-response statements and the second selection of proposed-response statements.

9. The method of claim 1, wherein a proposed-response statement from plurality of proposed-response statements comprise human-readable text.

10. The method of claim 1, wherein proposed-response statement from the plurality of proposed-response statements selected from a group consisting of: image data, audio data, and video data.

11. The method of claim 1, wherein each proposed-response statement in the first selection of proposed-response statements includes a rank given by the first human user.

12. The method of claim 11, wherein selecting the second set of proposed-response statements comprises:
    selecting the second set of proposed-response statements in response to the rank given by the first human user of each proposed-response statement in the first selection of proposed-response statements by the first user.

13. The method of claim 1, wherein each proposed-response statement in the second selection of proposed-response statements includes a rank given by the second human user.

14. The method of claim 13, wherein determining the ranked set of proposed-response statements comprises:
   determining the ranked set of proposed-response statements from the plurality of proposed-response statements in response to the rank given by the first human user of each proposed-response statement in the first selection of proposed-response statements by the first human user and in response to the rank given by the second human user of each proposed-response statement in the second selection of proposed-response statements by the second human user.

15. The method of claim 1, wherein a weight is associated, by the first human user, with each proposed-response statement in the first selection of proposed-response statements.

16. The method of claim 15, wherein the weight is adjusted according to demographic information of the first human user.

17. The method of claim 1, wherein a weight is associated, by the second human user, with each proposed-response statement in the second selection of proposed-response statements.

18. The method of claim 17, wherein the weight is adjusted according to demographic information of the second human user.

19. A computer program embodied on a computer-readable medium and operative to control a computer system, the computer system including a memory, the computer program comprising:
   a code segment storing a plurality of proposed-response statements in the memory that are responsive to a human-specified query;
   a code segment selecting a first set of proposed-response statements from the plurality of proposed-response statements;
   a code segment sending the first set of proposed-response statements for sensory output to a first human user at a first computer client;
   a code segment sending the human-specified query for sensory output to the first human user at the first computer client;
   a code segment receiving a first selection of proposed-response statements from the first computer client, the first selection of proposed-response statements selected from the first set of proposed-response statements by the first human user in response to the human-specified query;
   a code segment selecting a second set of proposed-response statements from the plurality of proposed-response statements in response to the first selection of proposed-response statements by the first human user;
   a code segment sending the second set of proposed-response statements for sensory output to a second human user at a second computer client;
   a code segment sending the human-specified query for sensory output to the second human at the second computer client;
   a code segment receiving a second selection of proposed-response statements from the second computer client, the second selection of proposed-response statements selected from the second set of proposed-response statements by the second human user in response to the human-specified query;
   a code segment determining a proposed selection of proposed-response statements from the plurality of proposed-response statements in response to the first selection of proposed-response statements by the first human user and to the second selection of proposed-response statements by the second human user; and
   a code segment sending the proposed selection of proposed-response statements to a third user at a third computer client.

20. The computer program of claim 19, wherein the second set of proposed-response statements includes the first selection of proposed-response statements.

21. The computer program of claim 19, wherein the second set of proposed-response statements includes at least one proposed-response statement from the first selection of proposed-response statements.

22. The computer program of claim 19, wherein the second set of proposed-response statements includes a proposed-response statement not within the first selection of proposed-response statements.

23. The computer program of claim 19, further comprising:
   a code segment receiving a new proposed-response statement from the first human user; and
   a code segment adding the new proposed-response statement to the plurality of proposed-response statements in the memory.

24. The computer program of claim 23, wherein the second selection of proposed-response statements includes the new proposed-response statement.

25. The computer program of claim 19, wherein the code segment determining the proposed selection of proposed-response statements comprises:
   a code segment selecting proposed-response statements from the first selection of proposed-response statements and the second selection of proposed-response statements.

26. The computer program of claim 19, wherein the code segment determining the proposed selection of proposed-response statements comprises:
   a code segment selecting proposed-response statements that are both within the first selection of proposed-response statements and the second selection of proposed-response statements.

27. The computer program of claim 19, wherein a proposed-response statement from the plurality of proposed-response statements comprise human-readable text.

28. The computer program of claim 19, wherein proposed-response statements from the plurality of proposed-response statements are selected from a group consisting of: image data, audio data, and video data.

29. The computer program of claim 19, wherein a ranking is associated, by the first human user, with proposed-response statement in the first selection of proposed-response statements.

30. The computer program of claim 29, wherein the code segment selecting the second set of proposed-response statements comprises:
   a code segment selecting the second set of proposed-response statements in response to the first selection of proposed-response statements by the first human user and in response to the ranking associated with each proposed-response statement in the first selection of proposed-response statements.

31. The computer program of claim 19, wherein a ranking is associated, by the second human user, with each proposed-response statement in the second selection of proposed-response statements.

32. The computer program of claim 31, wherein the code segment determining the proposed selection comprises:

a code segment determining the proposed selection of proposed-response statements from the plurality of proposed-response statements in response to the first selection of proposed-response statements by the first human user and in response to the second selection of proposed-response statements by the second human user, and based at least partially on the ranking associated with each proposed-response statement in the second selection of proposed-response statements.

33. The computer program of claim 19, wherein a weight is associated, by the first human user, with each proposed-response statement in the first selection of proposed-response statements.

34. The computer program of claim 33, wherein the weight is adjusted according to demographic information of the first human user.

35. The computer program of claim 19, wherein a weight is associated, by the second human user, with each proposed-response statement in the second selection of proposed-response statements.

36. The computer program of claim 35, wherein the weight is adjusted according to demographic information of the second human user.

* * * * *